United States Patent
Kanazawa

(10) Patent No.: US 6,554,735 B2
(45) Date of Patent: Apr. 29, 2003

(54) PLANETARY GEAR TYPE DIFFERENTIAL APPARATUS

(75) Inventor: Kazuo Kanazawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/967,683

(22) Filed: Sep. 27, 2001

(65) Prior Publication Data

US 2002/0042320 A1 Apr. 11, 2002

(30) Foreign Application Priority Data

Sep. 28, 2000 (JP) .................................... 2000-297257
Sep. 28, 2000 (JP) .................................... 2000-297258

(51) Int. Cl.[7] .......................... F16H 48/20; B60K 17/35
(52) U.S. Cl. ........................................ 475/249; 180/249
(58) Field of Search ........................ 475/249; 180/249; 192/54.5, 93 R, 76

(56) References Cited

U.S. PATENT DOCUMENTS 4,041,804 A * 8/1977 Clark ........................... 475/88
4,535,651 A * 8/1985 Chambers .................. 475/234
5,102,378 A * 4/1992 Gobert ........................ 475/231
5,246,408 A * 9/1993 Kobayashi .................. 475/221
5,464,084 A * 11/1995 Aoki et al. .................. 192/35
6,063,000 A * 5/2000 Sugimoto .................... 475/231
6,371,880 B1 * 4/2002 Kam ............................ 475/249

FOREIGN PATENT DOCUMENTS

| JP | A 1-278841 | 11/1989 | ........... B60K/17/35 |
| JP | A 5-112149 | 5/1993 | ........... B60K/17/348 |
| JP | A 8-145145 | 6/1996 | ........... F16H/48/20 |

* cited by examiner

*Primary Examiner*—Rodney H. Bonck
*Assistant Examiner*—Dennis Abdelnour
(74) *Attorney, Agent, or Firm*—Darby & Darby

(57) ABSTRACT

A sliding surface is formed on an inner periphery of a drum member secured to a rear output shaft of a differential limiting device. There is provided a cam member between a projection and the sliding surface. The cam member has a friction surface slidable on the sliding surface and a V-shaped groove engageable with the projection. When a relative rotation occurs between the drum member and the carrier, the position where the projection is engaged with the V-shaped groove deviates so as to press the cam member toward the sliding surface. As a result, due to a frictional resistance of the friction surface against the sliding surface, first a differential limiting occurs between the drum member and the carrier and then a differential is locked up by a wedge effect of a corner edge of the cam member.

16 Claims, 10 Drawing Sheets

PLANETARY GEAR TYPE DIFFERENTIAL APPARATUS

BACKGROUND OF THE INVENTION

The present invention relates to a differential locking or limiting apparatus of a planetary gear type differential for locking up a differential between a carrier and a shaft member provided with a sun gear.

A variety of differential locking apparatuses in which two of input and output shafts can be locked up with each other have been proposed to date. Generally, these differential locking apparatuses are constituted by a multiple disc clutch provided between two of input and output shafts and a differential limiting mechanism for pressing the multiple disc clutch when a differential rotation generates between these two shafts. For example, Japanese Paten Unexamined Publication No. Hei. 1-278841 discloses a differential locking apparatus of a planetary gear type center differential comprising a multiple disc clutch provided between front and rear wheels and a ball cam for pressing the multiple disc clutch when a differential rotation generates between the front and rear wheels.

However, the differential locking apparatus having the multiple disc clutch and the differential limiting mechanism incurs a complication of the apparatus and an up-sizing of the apparatus. Particularly since the multiple disc clutch is constituted by a plurality of drive and driven plates arranged in the axial direction, the up-sizing in the axial direction is noticeable.

Further, conventionally, a differential is provided with a differential limiting apparatus which adds a differential limiting torque as an initial torque in advance, or bypasses and transmits a torque to the other output shaft when one output shaft slips.

This sort of differential limiting apparatus is generally constituted by a hydraulic multiple disk clutch, and for example, Japanese Patent Unexamined Publication No. Hei. 5-112149 discloses a technique in which in a planetary gear center differential, a hydraulic multiple disk clutch is provided between a carrier and a rear drive shaft, and a differential limiting torque is generated in the hydraulic multiple disk clutch in accordance with a rear wheel slip.

However, since the hydraulic multiple disk clutch is generally constituted in such a manner that a plurality of drive plates and driven plates are arranged, there is a fear that a device becomes complicated and large-sized.

SUMMARY OF THE INVENTION

It is an object of the present invention to provide a differential locking or limiting apparatus for a planetary gear type differential having a small size and simple structure.

In order to attain the object, a planetary gear type differential apparatus provided on a shaft member and having a carrier rotatably mounted on said shaft member, a sun gear secured on the shaft, a pinion meshing with the sun gear, and a pinion shaft secured to the carrier for rotatably supporting the pinion. The differential apparatus comprises a sliding surface provided on the shaft, a projection formed at an end portion of the pinion-shaft and projected from an end surface of the carrier, and a cam member including a friction surface slidable on the sliding surface and a V-shaped groove engageable with the projection and provided between the sliding surface and the projection.

That is, according to the invention, when a differential occurs between the shaft member and the carrier, the cam member relatively moves with respect to the carrier by frictional resistance of the friction surface against the sliding surface and the position where the projection is engaged with the V-shaped groove deviates. According to the deviation amount of the projection with respect to the groove, a pressure toward the sliding surface generates in the cam member and the frictional resistance of the friction surface against the sliding surface is increased to perform a differential between the shaft member and the carrier. When the amount of the positional deviation of the projection with respect to the V-shaped groove further increases, the relationship between the shaft and the carrier is locked due to the wedge effect of the friction surface.

In addition to this, the above-mentioned object can be achieved by a planetary gear type differential apparatus provided on a shaft member and having a carrier rotatably mounted on said shaft member, a sun gear provided at the shaft portion, a pinion engaged with the sun gear, and a pinion shaft for rotatably supporting the pinion to the carrier, the differential apparatus according to the present invention comprising:

an annular sliding portion provided on the shaft member;
a projection formed by protruding an end portion of the pinion shaft from an end surface of the carrier;
a cam member disposed between the sliding portion and the projection, the cam member including a friction surface that is slidably engaged with the sliding portion and a V-shaped groove that is engageable with the projection; and
a pair of restriction sections which are formed at an end surface of the carrier and disposed at both sides of the cam member, each of the restriction sections regulating the movement of the cam member in a rotational direction of the carrier while a predetermined swing motion is permitted.

According to the invention, when a differential movement is occurred between the shaft member and the carrier, the cam member is moved relatively to the carrier between the restriction sections by friction resistance of the friction surface with respect to the sliding portion. At that time, an engagement position of the V-shaped groove with respect to the projection is shifted. In accordance with the shifting amount of the engagement position of the V-shaped groove relative to the projection, a press force in the direction toward the sliding portion is generated at the cam member, and the friction resistance of the friction surface with respect to the sliding portion is increased. Therefore, a differential limitation is made between the shaft portion and the carrier.

With this structure, the cam member is positioned at the inner periphery of the sliding portion, and the press force by a centrifugal force in the direction toward the sliding portion is applied to the cam member.

In the above-mentioned structure, it is preferable that the shaft member comprises:

a shaft; and
a drum member fixed to the shaft and having an inner periphery on which the sliding portion is formed.

In the above-mentioned structure, it is preferable that the shaft member comprises:

a shaft having an outer periphery on which the sliding portion is formed.

Further, in the above-mentioned structure, it is also preferable that the shaft member comprises:

a shaft; and
a ring member coupled with the shaft and having an outer periphery on which sliding portion is formed.

With the structure, the cam member is positioned at the outer periphery of the sliding portion, and a force to cancel the press force in the direction toward the sliding portion by a centrifugal force is applied to the cam member.

Moreover, in the above-mentioned structure, it is advantageous to further comprise an energizing member urging the cam member towards the sliding portion.

With this structure, an initial torque in the planetary gear type differential can be generated.

DESCRIPTION OF THE DRAWINGS

FIG. 6 is a main portion of a sectional view of the center differential;

FIG. 7 is a VII—VII sectional view of FIG. 8;

FIG. 8 is a schematic view of the transmission;

FIG. 9 is the main portion of the sectional view of the center differential; and FIG. 10 is a X—X sectional view of FIG. 9.

DETAILED DESCRIPTION OF THE PREFERRED EMBODIMENTS

Figure 1:
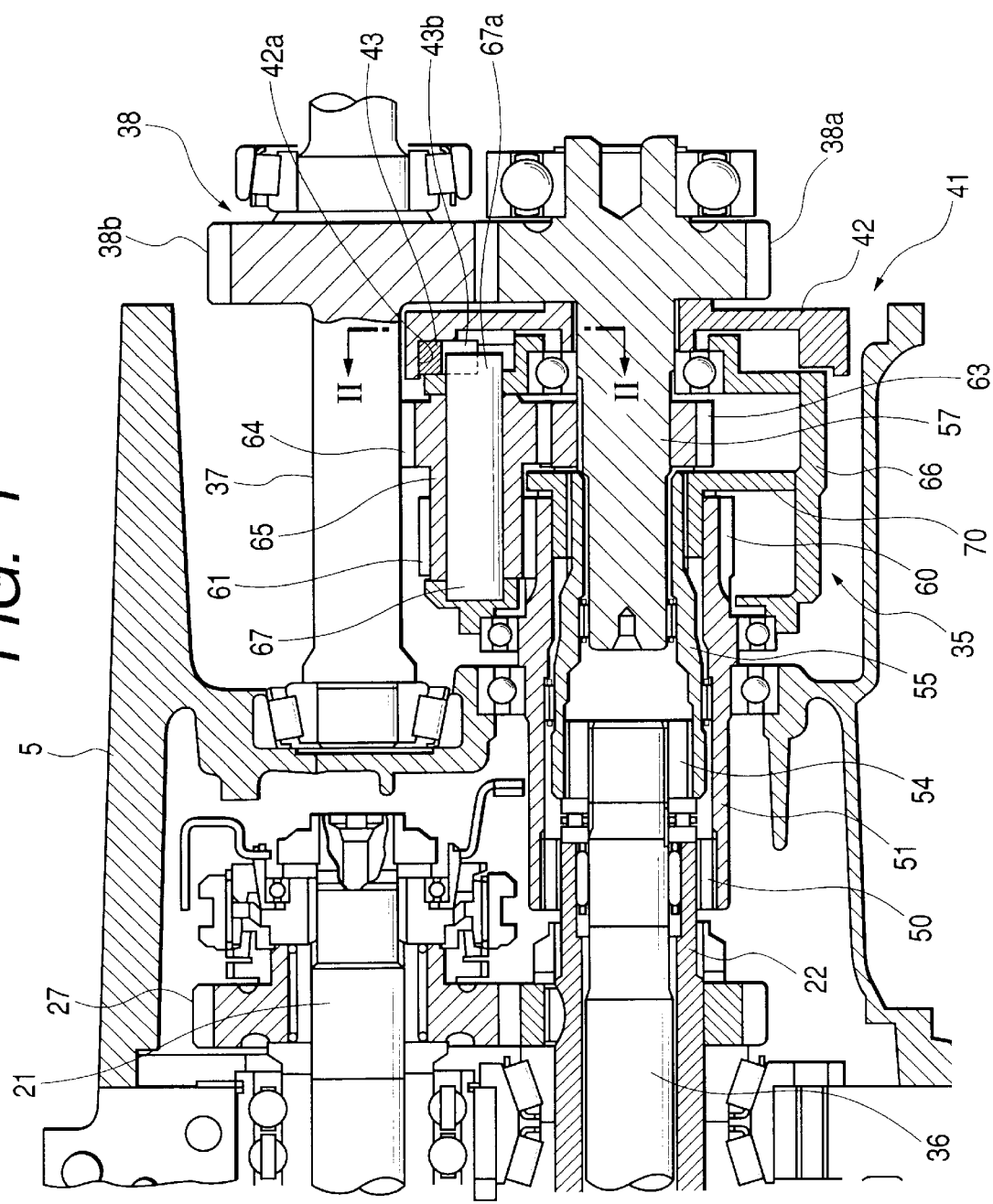
FIG. 1 is a sectional view showing a center differential according to a first embodiment of the present invention.
Figure 2A:
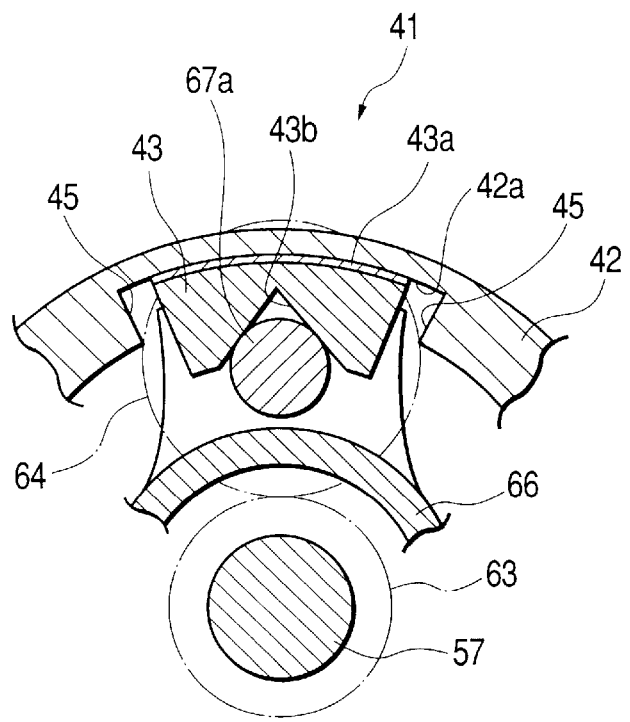
FIGS. 2(a) and 2(b) are a sectional view taken along a line II—II of FIG. 1.

Referring now to FIGS. 1 and 2, reference numeral 1 denotes an engine disposed in a front portion of a vehicle and reference numeral 2 denotes a manual transmission connected to a rear part of the engine 1. Behind a clutch housing 3 of the manual transmission 2, a transmission case 4 is formed integrally with the clutch housing 3. Further, a transfer case 5 is connected with a rear part of the transmission case 4. Further, an extension case 6 is connected with a rear part of the transfer case 5. The clutch housing 3 includes a starting clutch 7, the transmission case 4 includes a final reduction gear unit 8 and a manual transmission 9 and the transfer case 5 includes a transfer section 10.

A crankshaft 11 of the engine 1 is connected with the starting clutch 7 and the starting clutch 7 is connected with an input shaft 21 of the manual transmission 9.

The manual transmission 9 has a hollow counter shaft 22 provided in parallel with the input shaft 21 and a $1^{st}$ gear train 23, a $2^{nd}$ gear train 24, a $3^{rd}$ gear train 25 and a $4^{th}$ gear train 26 are arranged in this order between the input shaft 21 and the counter shaft 22. A synchromesh mechanisms 30 is provided between the $1^{st}$ gear train 23 and the $2^{nd}$ gear train 24 and a synchromesh mechanism 31 is provided between the $3^{rd}$ gear train 25 and the $4^{th}$ gear train 26, respectively. Further, a reverse gear train 28 is disposed between the $1^{st}$ gear train 23 and the $2^{nd}$ gear train 24.

Further, the input shaft 21 and counter shaft 22 extends inside of the transfer case 5 in which a $5^{th}$ gear train 27 and synchromesh mechanism 32 are disposed between these two shafts. Thus, the manual transmission 9 is constituted so as to be shifted to any one of five forward speed gears by selectively actuating those three synchromesh mechanisms 30, 31 and 32 and to be shifted to a reverse position by engaging the reverse gear train 28.

In the transfer case 5, a planetary gear type center differential 35 is disposed on the counter shaft 22. The center differential 35 is driveably (functionally) connected with a front drive shaft 36 disposed in the counter shaft 22 and also driveably connected with a rear drive shaft 37 disposed on the same axis as the input shaft 21 through a transfer gear train 38 so as to distribute a shifted power inputted from the counter shaft 22 between both drive shafts 36, 37. Further, the power transmitted to the front drive shaft 36 is transmitted to the final reduction gear unit 8 of front wheels and on the other hand the power transmitted to the rear drive shaft 37 is transmitted to a final reduction gear unit 40 of rear wheels through a propeller shaft 39. Further, a differential locking apparatus 41 is incorporated in the rear of the center differential 35 so as to be able to connect the front wheels with rear wheels.

Next, the center differential 35 according to the present invention will be described in detail by reference to FIG. 1.

The center differential 35 includes a hollow center differential input shaft 51 spline-fitted at an end portion thereof to the outer periphery of the counter shaft 22 through an intermediate member 50, a hollow front output shaft 55 spline-fitted at an end portion thereof over the outer periphery of the hollow front output shaft 55 through a intermediate member 54 and a rear output shaft 57 fitted at an end portion thereof to the front output shaft 55. These shafts 51, 55 and 57 are in a rotatable relationship with each other.

A first sun gear 60 having a large diameter is formed integrally with the center differential input shaft 51 at the other end thereof and a plurality of first pinions 61 meshes with the first sun gear 60. In this embodiment, three first pinions 61 are arranged around the first sun gear 60 at an equal interval.

Also, a second sun gear 63 having a small diameter is spline-fitted to the rear output shaft 57 and a plurality of second pinions 64 having a large diameter mesh with the second sun gear 63 therearound. In this embodiment, three second pinions 64 are arranged around the second sun gear 63 at an equal interval.

The first pinion 61 and the second pinion 64 are formed integrally on a pinion member 65, forming a pair of the first and second pinions 61, 64. In this embodiment, three pairs of the first and second pinions 61, 64 are formed on the pinion member 65. The pinion member 65 is rotatably supported by a pinion shaft 67 secured to a carrier 66.

That is, the center differential input shaft 51 is rotatably fitted to the carrier 66 from the front and the rear output shaft 57 is rotatably fitted to the carrier 66 from the rear. The first sun gear 60 and the second sun gear 63 are accommodated in a space enclosed by the carrier 66. Further, the pinion shaft 67 is provided across the front and rear part of the carrier 66 in such a manner that the first pinion 61 meshes with the first sun gear 60 and the second pinion 64 meshes with the second sun gear 63.

The rear end of the front output shaft 55 is projected into the carrier 66. A hub 70 secured to the inner periphery of the carrier 66 extends inwardly through a space between the first and second sun gears 60, 63 and is spline-fitted over the front output shaft 55 at the rear end thereof. Further, the power transmitted from the pinion member 65 to the carrier 66 through the pinion shaft 67 is transmitted to the front drive shaft 36 through the hub 70 and the front output shaft 55.

On the other hand, a transfer drive gear 38a is integrally formed with the rear output shaft 57 at the rear thereof.

Further, a transfer drive gear 38b meshing with the transfer drive gear 38a is integrally formed with the rear drive shaft 37, constituting a transfer gear train 38. The power transmitted to the rear output shaft 57 through the second sun gear 63 is transmitted to the rear drive shaft 37 through the transfer gear train 38, after being shifted by the transmission.

As shown in FIGS. 1 and 2, the differential locking apparatus 41 has a drum member 42 spline-fitted at the rear of the center differential 35 over the rear output shaft 57. The drum member 42 has a sliding surface 42a shaped in a partial arc on an inner periphery surface of the drum member 42 and enclosed by restriction sections 45, 45.

An end portion of the pinion shaft 67 projects from the rear end surface of the carrier 66 supporting the pinion shaft 67 and this projection 67a is opposite to the sliding surface 42a in the drum member 42.

Further, there is provided a cam member 43 between the sliding surface 42a and the projection 67a. The cam member 43 has a friction surface 43a shaped in a partial arc which is slidable on the sliding surface 42a and a V-shaped groove 43b which is engageable with the projection 67a. Since the friction surface 43a abuts against the sliding surface 42a and the projection 67a is engaged with the V-shaped groove 43b, the cam member 43 is supported between the sliding surface 42a and the projection 67a.

Further, when a relative rotation occurs between the drum member 42 and the carrier 66, the cam member 43 makes a relative movement with respect to the carrier 66. Then, one corner edge of the friction surface 43a rises and the other corner edge sinks. As a result, in accordance with a deviation amount of an engagement position of the V-shaped groove 43b with respect to the projection 67a, pressure toward the sliding surface 42a generates in the direction of the cam member 43 and a frictional resistance of the friction surface 43a against the sliding surface 42a increases. As a result, a differential limiting is performed between the rear output shaft 57 and the carrier 66. Furthermore, when the relative rotation continues between the drum member 42 and the carrier 66, the cam member 43 locks a differential between the output shaft 57 and the carrier 66 due to a wedge effect of the one corner edge of the friction surface 43a. The friction surface 43a is formed by coating or bonding friction material on the cam member 43.

Next, an operation of thus constituted manual transmission 2 will be described.

First, when the gear is shifted to a forward position after the starting clutch 7 is disengaged, one of the gear trains 23, 24, 25, 26 and 27 corresponding to the $1^{st}$, $2^{nd}$, $3^{rd}$, $4^{th}$ and $5^{th}$ speed ratios respectively is selected while it synchronizes with the input shaft 21 by the help of the synchromesh mechanisms 30, 31 or 32. When the starting clutch 7 is engaged, the power of the engine 1 is inputted to the input shaft 21 of the manual transmission 9 and the power shifted by the selected gear trains is outputted to the counter shaft 22. Further, when the gear is shifted to a reverse speed ratio with a starting clutch 7 disengaged, the reverse gear train 28 is selected and reversed power is outputted to the counter shaft 22. Thus, the manual transmission 2 has five forward speed ratios and one reverse speed ratio.

The power shifted in the manual transmission 9 is inputted to the sun gear 60 of the center differential 35 and is transmitted to the pinion member 65 through the first pinion 61.

The center differential 35 has a torque distribution ratio between the front and rear wheels established to TF:TR= 36.4:63.6 by properly selecting gear ratios. Accordingly, the shifted power is distributed and outputted to the carrier 66 by 36.4% and to the second sun gear 63 by 63.6%, respectively. The power transmitted to the carrier 66 is transmitted to the front wheels through the hub 70, the front output shaft 55, the front drive shaft 36 and the final reduction gear unit 8. According to the rear-overdistributed torque distribution ratio of this embodiment, the vehicle has a taste of oversteer and as a result good turning ability and good steering characteristics. Further, when the vehicle makes a turn during driving in a four wheel drive mode, the planetary rotation of the first and second pinions 61, 64 of the center differential 35 allows to absorb the rotational difference between the front and rear wheels which generates when cornering and enables the vehicle to make a smooth turning.

In this moment, the second sun gear 63, namely, the drum member 42 has a relative rotation with respect to the carrier 66 and the cam member 43 makes a relative movement with respect to the carrier 66 by a small frictional resistance of the friction surface 43 against the sliding surface 42a. As a result, the engagement position of the V-shaped groove 43b with respect to the projection 67a changes. In accordance with the deviation amount of the engagement position of the V-shaped groove 43a, a pressure toward the sliding surface 42a generates in the cam member 43, the frictional resistance of the friction surface 43a against the sliding surface 42a increases, there occurs a differential limiting between the rear output shaft 57 and the carrier 66.

That is, when the cam member 43 makes a relative movement with respect to the carrier 66, the inclined surface of the V-shaped groove 43b is pressed by the projection 67a and the cam member 43 increases the frictional resistance against the drum member 42. Since the cam member 43 is biased toward the sliding surface 42a of the drum member 42 by a centrifugal force corresponding to the revolution number of the carrier 66, the differential limiting torque varies according to revolution number.

Figure 2B:
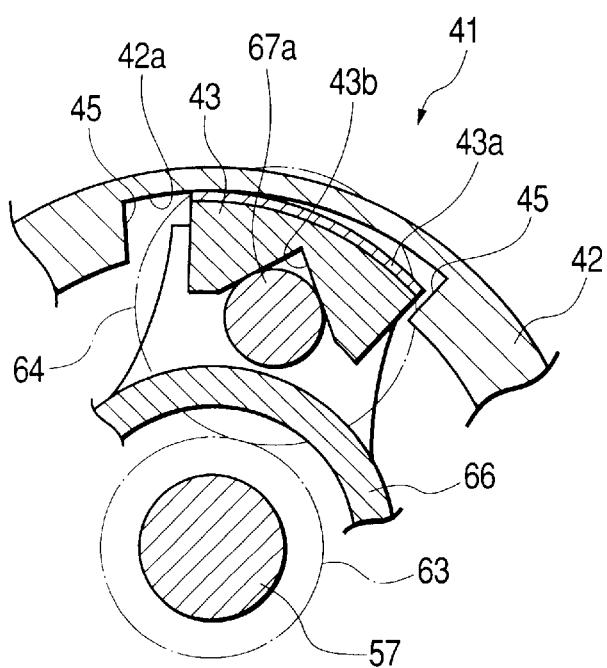
Figure 3:
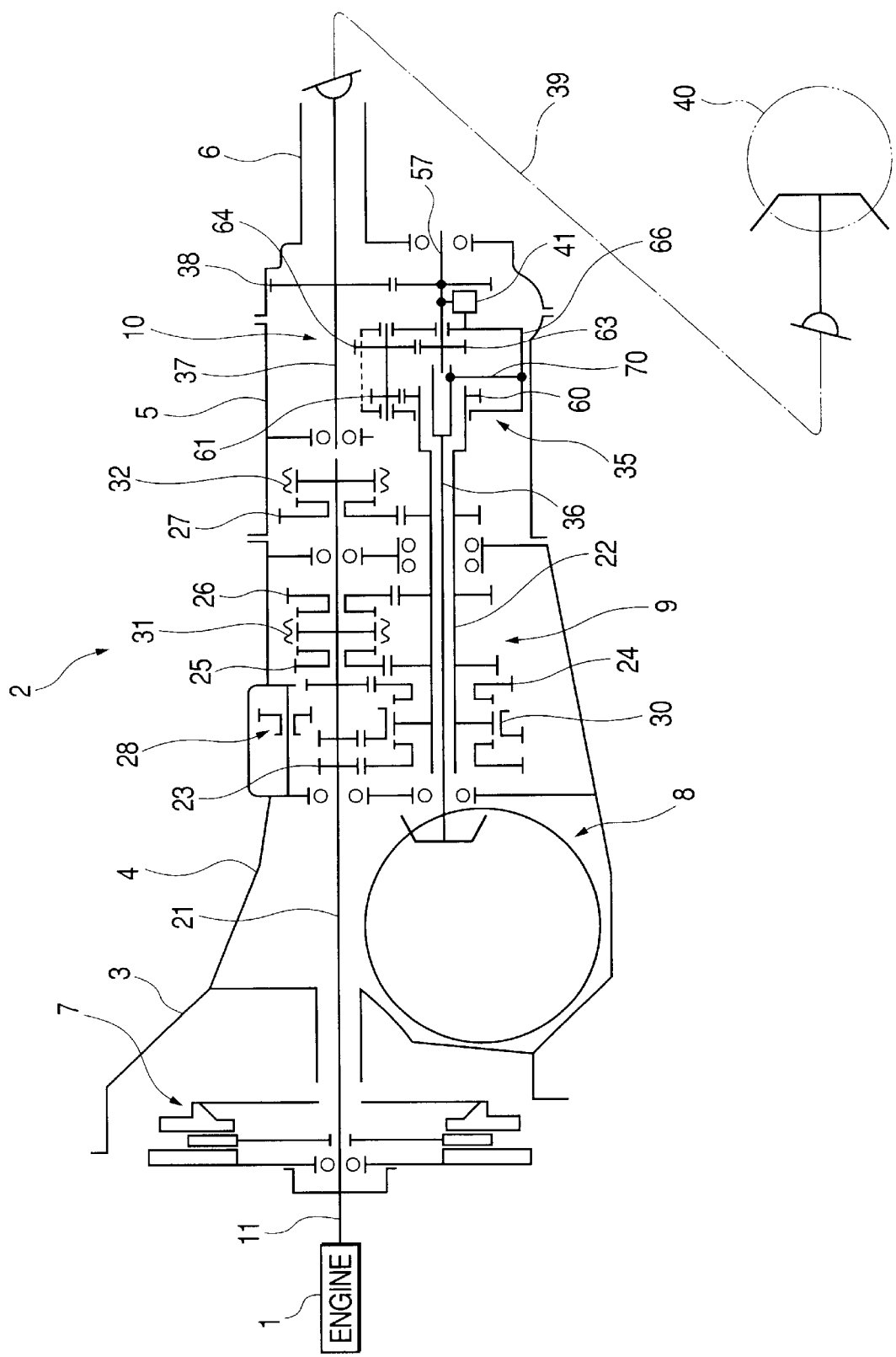
FIG. 3 is a schematic diagram of a transmission according to the first embodiment of the present invention.

When the relative rotation of the carrier 66 with respect to the drum member 42 becomes large and the cam member 43 makes a further relative movement with respect to the carrier 66, the cam member 43 locks up the differential between the rear output shaft 57 and the carrier 66 by the wedge effect of the corner edge of the friction surface 43a, as shown in FIG. 2b.

Further, even if the cam member 43 does not lock the differential, when the end surface of the cam member 43 contacts the restriction section, the differential locking apparatus 41 enters into a lock-up condition. That is, the differential locking apparatus 41 allows the center differential 35 to have a differential at the maximum within a range corresponding to the sliding interval from one restriction section 45 to the other restriction section 45.

Thus, according to the embodiment, the differential locking apparatus 41 is mainly constituted by the projection 67a, that is, the end portion of the pinion shaft 67 projected from the end surface of the carrier 66, and the cam member 43 interlocked with the projection 67a. That is, the differential locking apparatus 41 according to the present invention has a simple construction without using a plurality of clutch discs and accordingly the axial length of the apparatus can be reduced.

Further, the characteristics of differential limiting torques, the timing of differential lockings, can be easily changed by changing geometric dimensions of the V-shaped groove 43b.

Further, according to the differential locking apparatus 41 of the embodiment, since the differential lock is accomplished by the wedge effect, abrasion to some extent does not have an effect on the differential lock.

Further, an allowable maximum range of a differential can be changed by changing the interval between the restriction sections 45 and 45. Further, the overall inner periphery surface of the drum member 42 can be formed into a sliding surface 42*a* by abolishing the restriction section 45.

Figure 4:
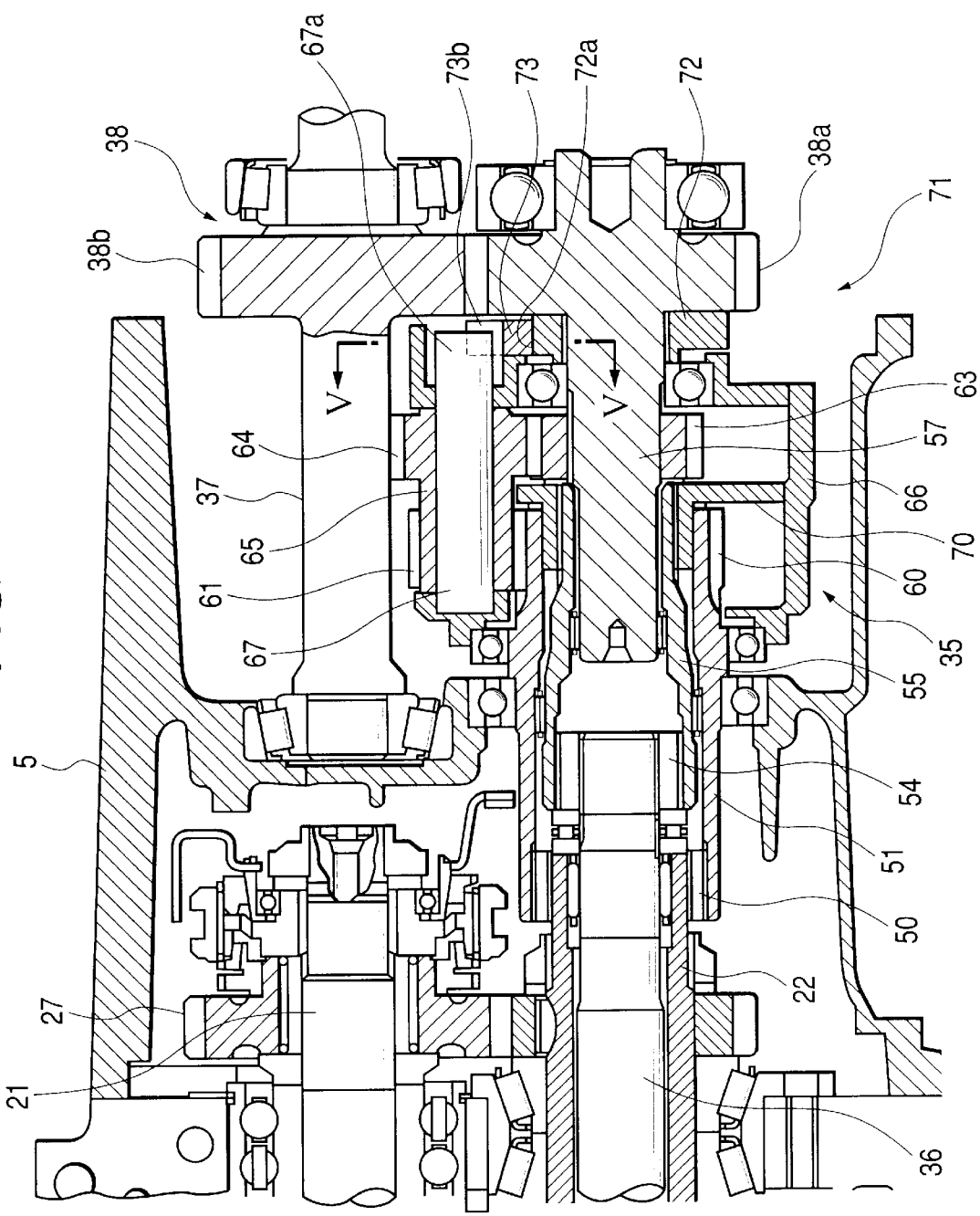
FIG. 4 is a sectional view showing the center differential according to a second embodiment of the present invention.
Figure 5:
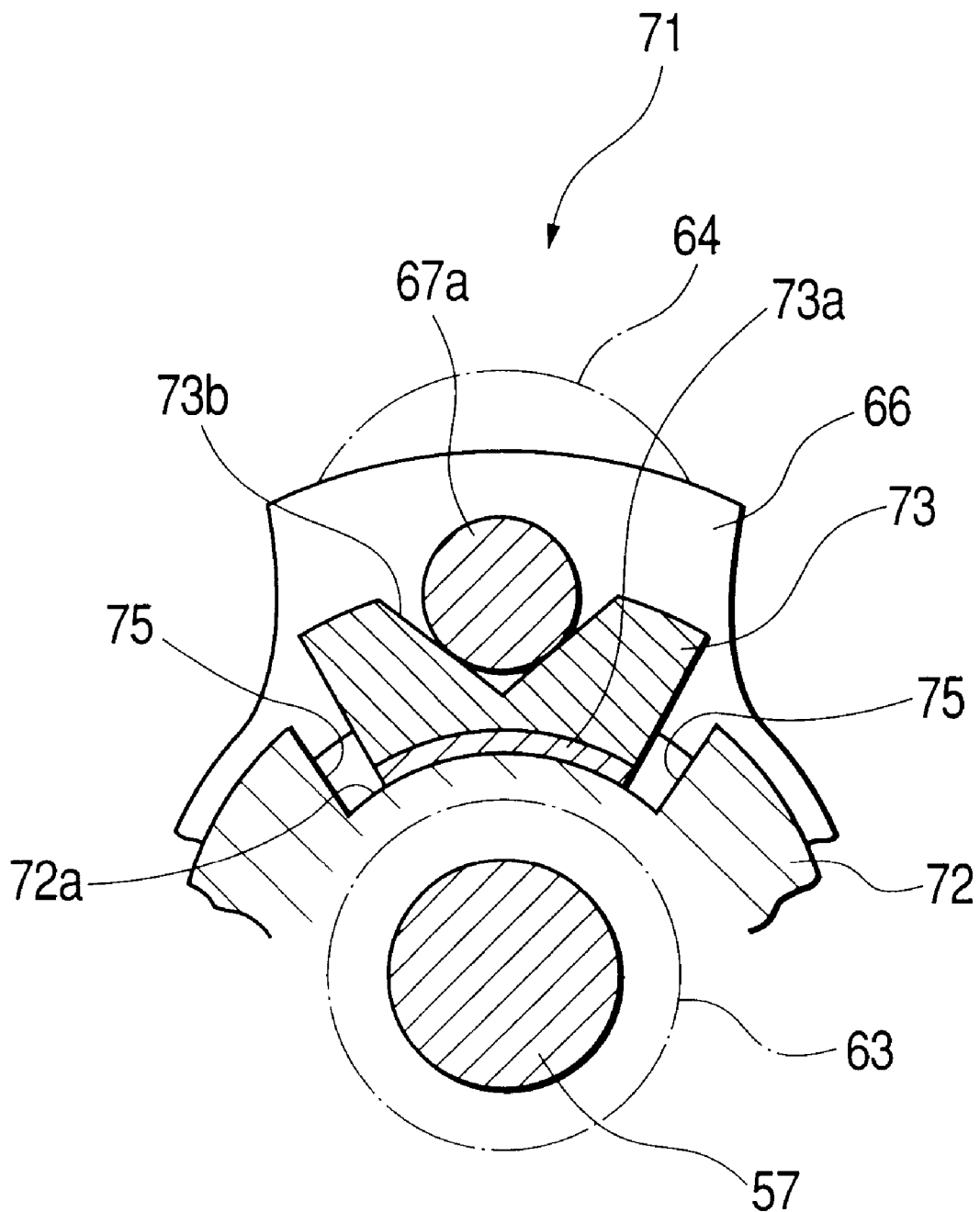
FIG. 5 is the sectional view taken along a line V—V of FIG. 4.

FIGS. 4 and 5 show a second embodiment of the present invention. In the drawings, reference numeral 71 denotes a differential locking apparatus wherein a ring member 72 is spline-fitted at the rear of the center differential 35 to the rear output shaft 57. A sliding surface 72*a* shaped in a partial arc and enclosed by restriction sections 75, 75 is formed around the outer periphery of the ring member 72. The ring member 72 may be formed directly on the rear output shaft 57 without being fitted to the rear output shaft 57.

Further, an end portion of the pinion shaft 67 is projected from the rear end surface of the carrier 66 for supporting the pinion shaft 67 and a projection 67*a* of the pinion shaft 67 is opposite to the sliding surface 72*a*.

Further, there is provided a cam member 73 between the sliding surface 72*a* and the projection 67*a*. The cam member 73 has a friction surface 73 shaped in a partial arc and slidable on the sliding surface 72*a* and a V-shaped groove 73*b* engageable with the projection 67*a*. Since the friction surface 73*a* contacts the sliding surface 72*a* and the projection 67*a* is engaged with the V-shaped groove 73*b*, the cam member 73 is held between the sliding surface 72*a* and the projection 67*a*.

When a relative rotation generates between the ring member 72 and the carrier 66, that is, between the projection 67*a* and the ring member 72, one corner edge of the cam member 73 is pressed toward the sliding surface 72*a* according to the deviation amount of the position where the V-shaped groove 73*b* is engaged with the projection 67*a*. Then, a frictional resistance between the friction surface 73*a* and the sliding surface 72*a* increases and a differential limiting occurs between the rear output shaft 57 and the carrier 66. Further, when the relative rotation between the ring member 72 and the carrier 66 becomes large, the cam member 73 locks up the relative rotation between the ring member 72 and the carrier 66 by the wedge effect of the corner edge of the cam member 73. The friction surface 73*a* is formed by coating or bonding the cam member 73 with an anti-frictional material.

Thus the differential locking apparatus has almost the same effect as the first embodiment.

Figure 6:
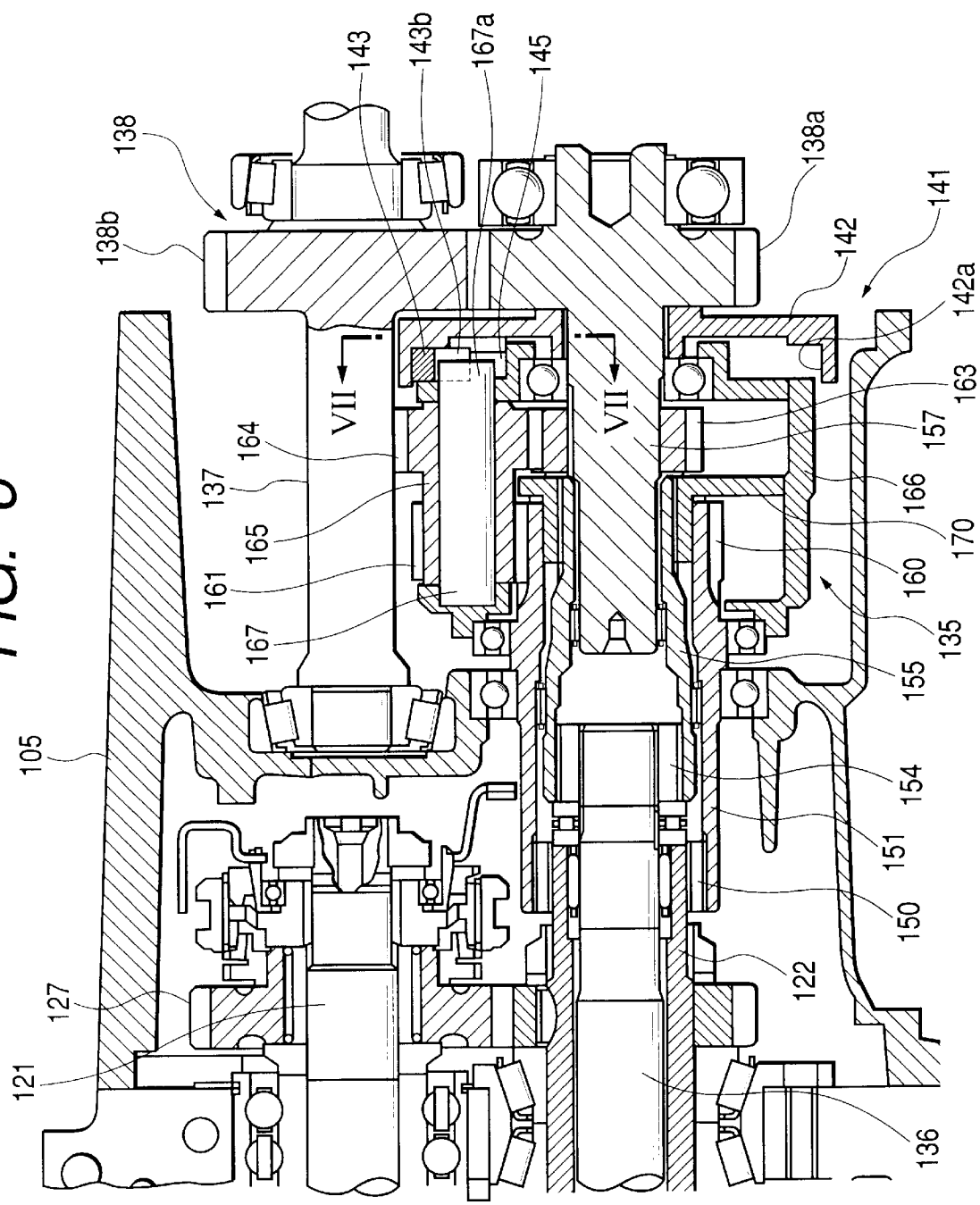
FIGS. 6 to 8 relate to the center differential according to a third embodiment of the present invention.
Figure 7:
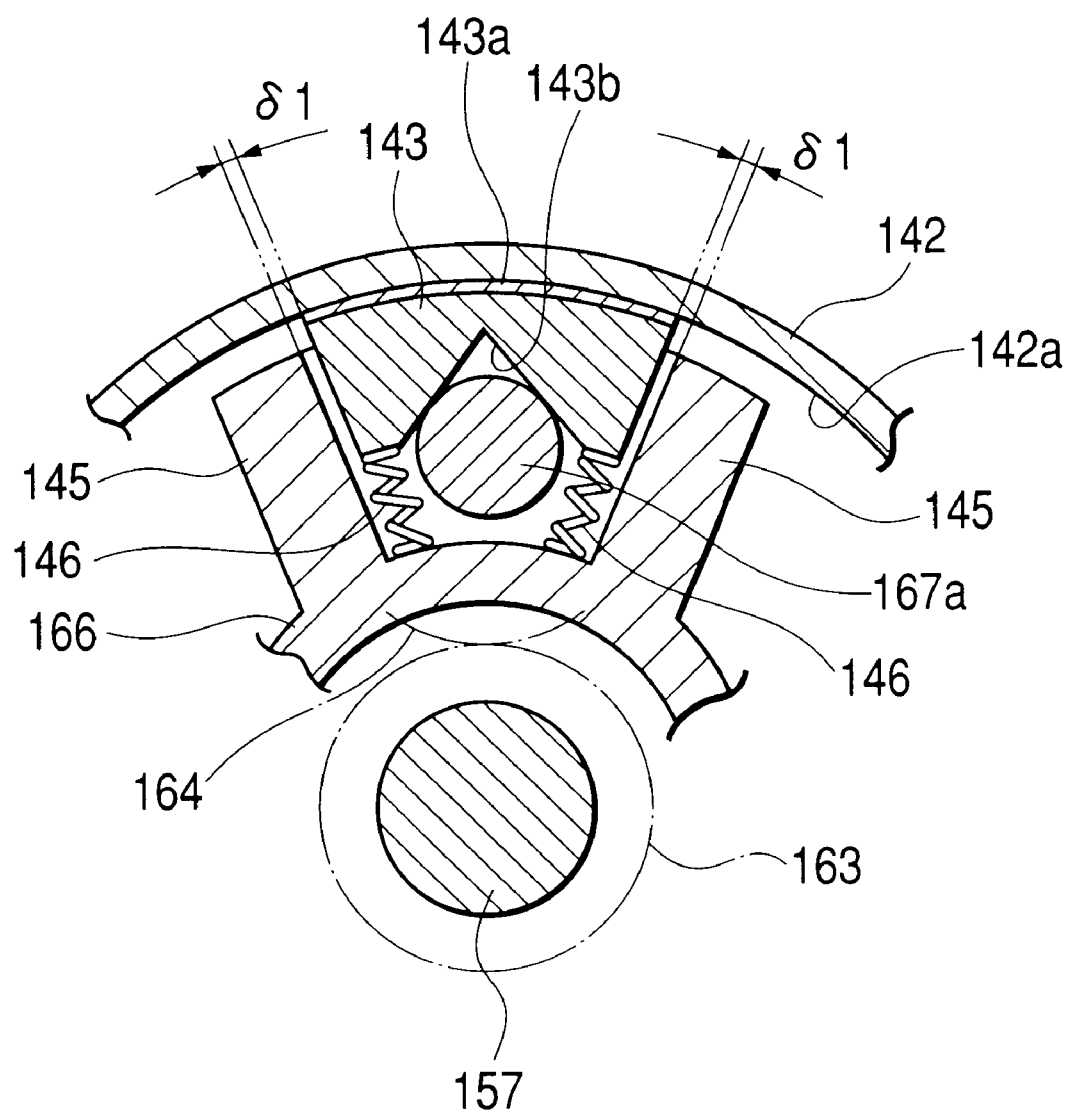
Figure 8:
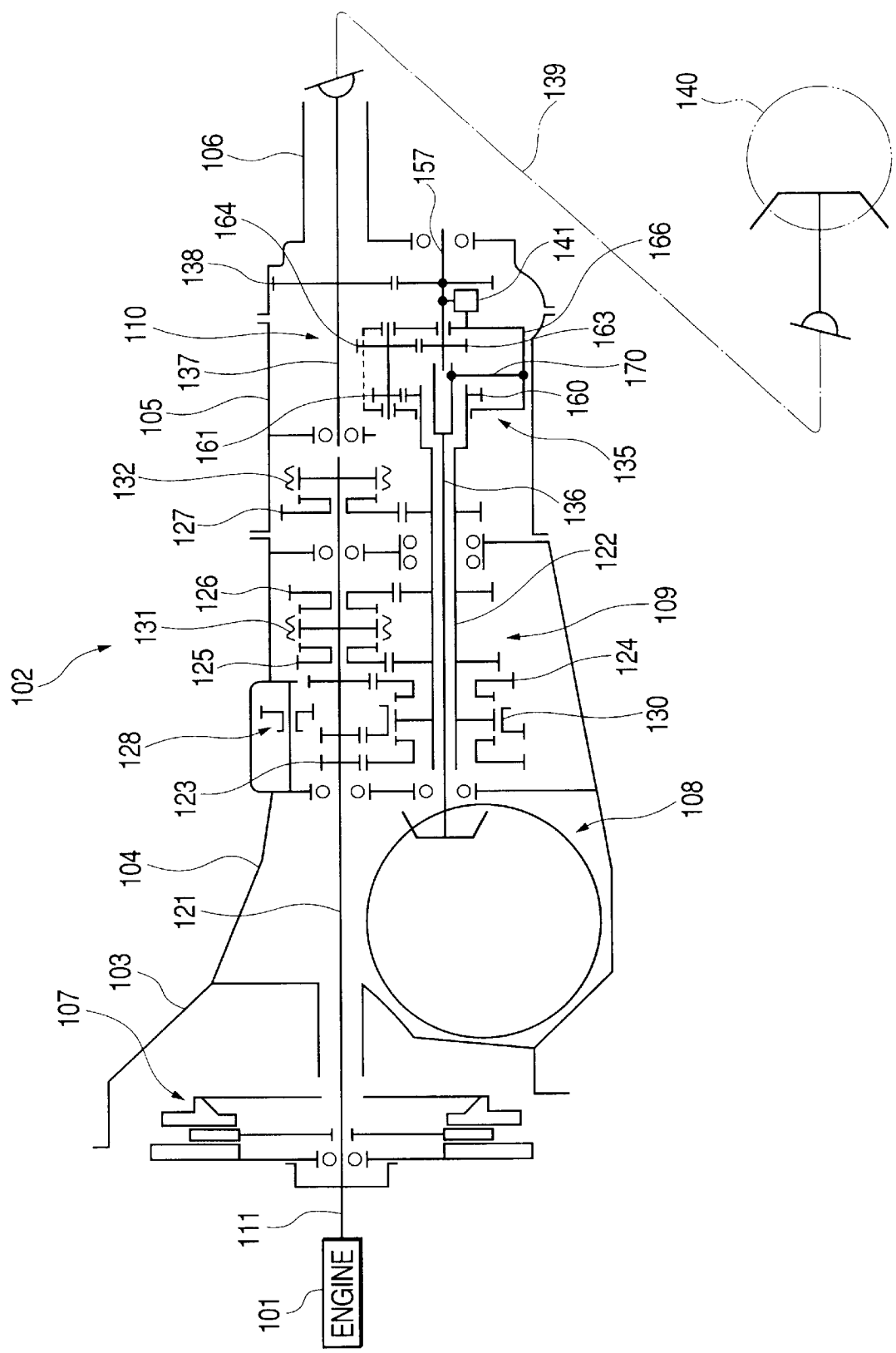

Hereinafter, another embodiments according to the invention will be described with reference to the drawings. FIGS. 6 to 8 relate to a third embodiment of the present invention, FIG. 6 is a main portion of a sectional view of a center differential, FIG. 7 is a VII—VII sectional view of FIG. 6, and FIG. 8 is a schematic view of a transmission.

In these drawings, reference numeral 101 designates an engine provided at the front of a vehicle body. Reference numeral 102 indicates a manual transmission coupled with the rear of the engine 101. A transmission case 104 is integrally formed behind a clutch housing 103 of the manual transmission 102. A transfer case 105 is coupled with the rear of the transmission case 104. An extension case 106 is sequentially coupled with the rear of the transfer case 105. A starting clutch 107 is disposed in the clutch housing 103. A final reduction gear 108 of the front wheel and a manual gearbox 109 are disposed in the transmission case 104. A transfer section 110 is disposed in the transfer case 105.

A crank shaft 111 of the engine 101 is coupled with the starting clutch 107. The starting clutch 107 is coupled with an input shaft 121 of the manual gearbox 109.

The manual gearbox 109 includes a hollow counter shaft 122 parallel to the input shaft 121. In the inside of the transmission case 104, a first-speed gear train 123, a second-speed gear train 124, a third-speed gear train 125, and a fourth-speed gear train 126 are sequentially disposed from the front between the input shaft and the counter shaft 122. Further, synchro mechanisms 130 and 131 are respectively provided between two gears. A reverse gear train 128 is arranged between the first-speed gear 123 and the second-speed gear.

The input shaft 121 and the counter shaft 122 are extended into the inside of the transfer case 105, and a fifth-speed gear train 127 and a synchro mechanism 132 are go disposed therebetween. The manual gearbox 109 is constructed in such a manner that the three sets of the synchro mechanisms 130, 131 and 132 are selectively operated to make a shift into any one of the five forward speeds or the reverse gear train 128 is engaged to make the shift into reverse.

In the transfer case 105, a planetary gear center differential 135 is disposed coaxially with the counter shaft 122. A front drive shaft 136 disposed in the counter shaft 122 is coupled with the center differential 135. A rear drive shaft 137 disposed coaxially with the input shaft 121 is coupled therewith through a transfer gear train 138. A speed-changed power inputted from the counter shaft 122 is distributed to both the drive shafts 136 and 137. The power transmitted to the front drive shaft 136 is transmitted to the final reduction gear 108 of the front wheel, while the power transmitted to the rear drive shaft 137 is transmitted to a final reduction gear 140 of a rear wheel through a propeller shaft 139. A differential limiting apparatus 141 is provided at the rear of the center differential 135, and makes a differential limitation between the front and rear wheels.

Next, the structure of the center differential 135 will be described in detail with reference to FIG. 6. The center differential 135 comprises a hollow center differential input shaft 151, a hollow front output shaft 155, and a rear output shaft 157. The front end side of the hollow center differential input shaft 151 is spline-coupled with the outer periphery of the counter shaft 122 through an intermediate member 150. The hollow front output shaft 155 is disposed in the inside of the center differential input shaft 151, and a tip end side of the hollow front output shaft 155 is spline-coupled with the outer periphery of the front drive shaft 136 through an intermediate member 154. The front end side of the rear output shaft 157 is made to face an inside of the front output shaft 155. The respective shafts 511, 155 and 157 are relatively and coaxially rotatable with each other on the same axis.

A large-sized first sun gear 160 is integrally formed at the rear end of the center differential input shaft 151. A plurality of (for example, three) small-sized first pinions 161 is engaged with the first sun gear 160 at equal intervals.

Besides, a small-sized sun gear 163 is spline-fitted to the middle of the rear output shaft 157. A plurality of (for example, three) large-sized second pinions 164 is engaged with the second sun gear 163 at equal intervals.

In the first and second pinions 161 and 164, the pairs of the first and second pinions 161 and 164 corresponding to each other are integrally formed on pinion members 165, and the respective pinion members 165 are rotatably supported on pinion shafts 167 fixed to a carrier 166.

That is, in the carrier 166, the center differential input shaft 151 is rotatably inserted from the front, while the rear output shaft 157 is rotatably inserted from the rear, and the first sun gear 160 and the second sun gear 163 are arranged in a center space. Then, the respective pinion shafts 167 are longitudinally provided so that the respective first pinions 161 can be engaged with the first sun gear 160, and the respective second pinions 164 can be engaged with the second sun gear 163.

Here, the first sun gear 160 and the second sun gear 163 are arranged in the inside of the carrier 166 at a predetermined interval, and the rear end side of the front output shaft 155 is made to face the inside of the carrier 166 from a gap between the first and second sun gears 160, 163. A hub 170 is fixed to the inner periphery of the carrier 166, and the hub 170 is extended into the inside of the center differential input shaft 151 from the gap between the first and second sun gears 160 and 163 and is spline-coupled with the outer periphery of the front output shaft 155. Then, the power transmitted to the carrier 166 through the pinion shaft 167 is transmitted to the front drive shaft 136 through the hub 170 and the front output shaft 155.

On the other hand, a transfer drive gear 138a is integrally formed near a rear end of the rear output shaft 157, and the transfer drive gear 138a is engaged with a transfer driven gear 138b formed integrally with the rear drive shaft 137 to constitute a transfer gear train 138. The power transmitted from the second sun gear 163 to the rear output shaft 157 is transmitted to the rear drive shaft 137 through the transfer gear train 138.

As shown in FIGS. 6 and 7, the differential limiting apparatus 141 is provided with a drum member 142 spline-fitted to the rear output shaft 157 at the rear of the center differential 135, and an annular sliding surface 142a is formed on the inner periphery of the drum member 142.

An end portion of the pinion shaft 167 is protruded from the rear end surface of the carrier 166 supporting the pinion shaft 167, and a projection 167a of the pinion shaft 167 is made opposite to the sliding surface 142a inside the drum member 142.

A cam member 143 is disposed between the sliding surface 42a and the projection 167a. The cam member 143 is provided with a partially arc-shaped friction surface 143a slidable on the sliding surface 142a and a V-shaped groove 143b engageable with the projection 167a. The friction surface 143a is brought into contact with the sliding surface 142a, and the V-shaped groove 143b is engaged with the projection 167a, so that the cam member 143 is supported between the sliding surface 142a and the projection 167a. When the cam member 143 is moved relatively to the carrier 166, a pressing force in the direction toward the sliding surface 142a is generated in the cam member 143 in accordance with a shift amount of engagement position of the V-shaped groove 143b with respect to the projection 167a. And then, the friction resistance of the friction surface 43a with respect to the sliding surface 142a is increased so that the differential limitation is made between the rear output shaft 157 and the carrier 166. Here, the friction surface 143a is formed on the cam member 143 by coating a friction material thereon or attaching/adhering a friction member, and so on.

A pair of restriction sections 145, 145 is protrusively formed at the rear end surface of the carrier 166 and at both sides of the cam member 143. The restriction sections 145, 145 regulate the movement of the cam member 143 in both rotational directions of the carrier 166 while a predetermined swing is permitted, and when the cam member 143 is located at a symmetrical position with respect to the projection 167a, gaps of δ1 are respectively provided at both sides of the cam member 143. Here, by suitably setting the gap δ1, the amount of the movement of the cam member 143 with respect to the carrier 166 is regulated, and the maximum value of a differential limitation torque by the cam member 143 is set, and a lock by excessive movement of the cam member 143 is prevented.

Besides, in the carrier 166, springs 146, 146 as a pair of energizing members are provided at both sides of the projection 167a, and the springs 146, 146 energize the cam member 143 in the direction toward the sliding surface 142a. Here, the energizing force by the springs 146, 146 is set to a minimum energizing force necessary for the cam member 143 to generate an initial torque between the front and rear wheels. At the same time, the springs 146, 146 have such a function that when the cam member 143 is moved relatively to the carrier 166, it is energized to restore/return to the original position.

Next, the operation of the manual transmission 102 according to the above structure will be described. First, when the starting clutch 107 is disengaged to make a shift into a forward speed during a stop or running, any one of the first-speed to the fifth-speed gear trains 123 to 127 is selected by the synchro mechanism 130, 131 or 132 while being synchronized and unified with the input shaft 121. When the starting clutch 107 is engaged, the power of the engine 101 is inputted to the input shaft 121 of the manual gearbox 109, and the speed-changed power by the selected speed change gear train is outputted to the counter shaft 122. Besides, at the time of a stop, when a reverse shift is made in a state where the starting clutch 107 is disengaged, the reverse gear train 128 is engaged, and the reversed speed-changed power is outputted to the counter shaft 122, and in this way, speeds are changed to the five forward speeds and one backward speed.

The power changed by the manual gearbox 109 is inputted to the first sun gear 160 of the center differential 135, and is transmitted to the pinion member 165 through the first pinion 161.

Here, in the center differential 135, since a torque distribution ratio to the front and rear wheels is set to, for example, TF:TR=36.4:63.6 by respective gear data, the speed-changed power is distributed so that 36.4% is outputted to the carrier and 63.6% is outputted to the second sun gear 163. The power of the carrier 166 is transmitted to the front wheel through the hub 170, the front output shaft 155, the front drive shaft 136, and the final reduction gear 108. Besides, the power of the second sun gear 163 is transmitted to the rear wheel through the rear output shaft 157, the transfer gear train 138, the rear drive shaft 137, the propeller shaft 139, and the final reduction gear 140. In the torque distribution like this in which much importance is attached (needed) to the rear wheel, an over-steering is rather realized, and the rotational property, steering property, and the like become excellent (much better). When the four-wheel drive running conditions, the difference in the number of revolutions of the front and rear wheels generated at the time of rotation is absorbed by the planetary rotation of the first and second pinions 161 and 164 of the center differential 135, and free rotation becomes possible.

When a differential motion is occurred between the rear output shaft 157 and the carrier 166, the engagement position of the V-shaped groove 143b with respect to the projection 167a is shifted. Namely, as shown in FIG. 7, when the drum portion 142 and the carrier 166 are relatively rotated, the cam member 143 is moved relatively to the carrier 166 by a minute friction resistance of the friction surface 143a with respect to the sliding surface 142a, so that the engagement position of the V-shaped groove 143b with respect to the projection 167a is shifted. In accordance with the shifting amount of the engagement position of the V-shaped groove 143b with respect to the projection 167a, the press force in the direction toward the sliding surface 142a is generated in the cam member 143, and the friction resistance of the friction surface 143a with respect to the sliding surface 142a is increased. Accordingly, the differential limitation is made between the rear output shaft 157 and the carrier 166. That is, when the cam member 143 is moved relatively to the carrier 166, the inclined surface of the V-shaped groove 143b is pressed to the projection 167a, and the friction resistance to the drum member 142 is increased.

Here, in the above structure, since the cam member 143 is energized to the side of the sliding surface 142a of the drum member 142 by centrifugal force in accordance with the number of revolutions of the carrier 166, a differential limitation torque variably acts also by the number of revolutions (speeds).

In the embodiment, a main portion of the differential limiting apparatus 141 has the projection 167a that is formed by protruding the end portion of the pinion shaft 167 from the end surface of the carrier 166, and the cam member 143 that is engaged with the projection 167a. Accordingly, the differential limiting apparatus 141 can be made simple and small-sized.

That is, since the differential limiting apparatus does not have a plurality of clutch plates or the like, the structure can be made simple, and the whole length in the axial direction can be shortened.

Besides, the characteristics of the differential limitation torque by the differential limiting apparatus 141 can be easily changed by merely changing an inclined angle of the V-shaped groove 143b, an interval of the restriction sections 145, 145, and the like, and the degree of freedom of design can be increased.

Besides, the response of the differential limitation torque at the time of differential movement can be improved by energizing the cam member 143 toward the side of the sliding surface 142a by a predetermined weak energizing force caused by the springs 146, 146.

Figure 9:
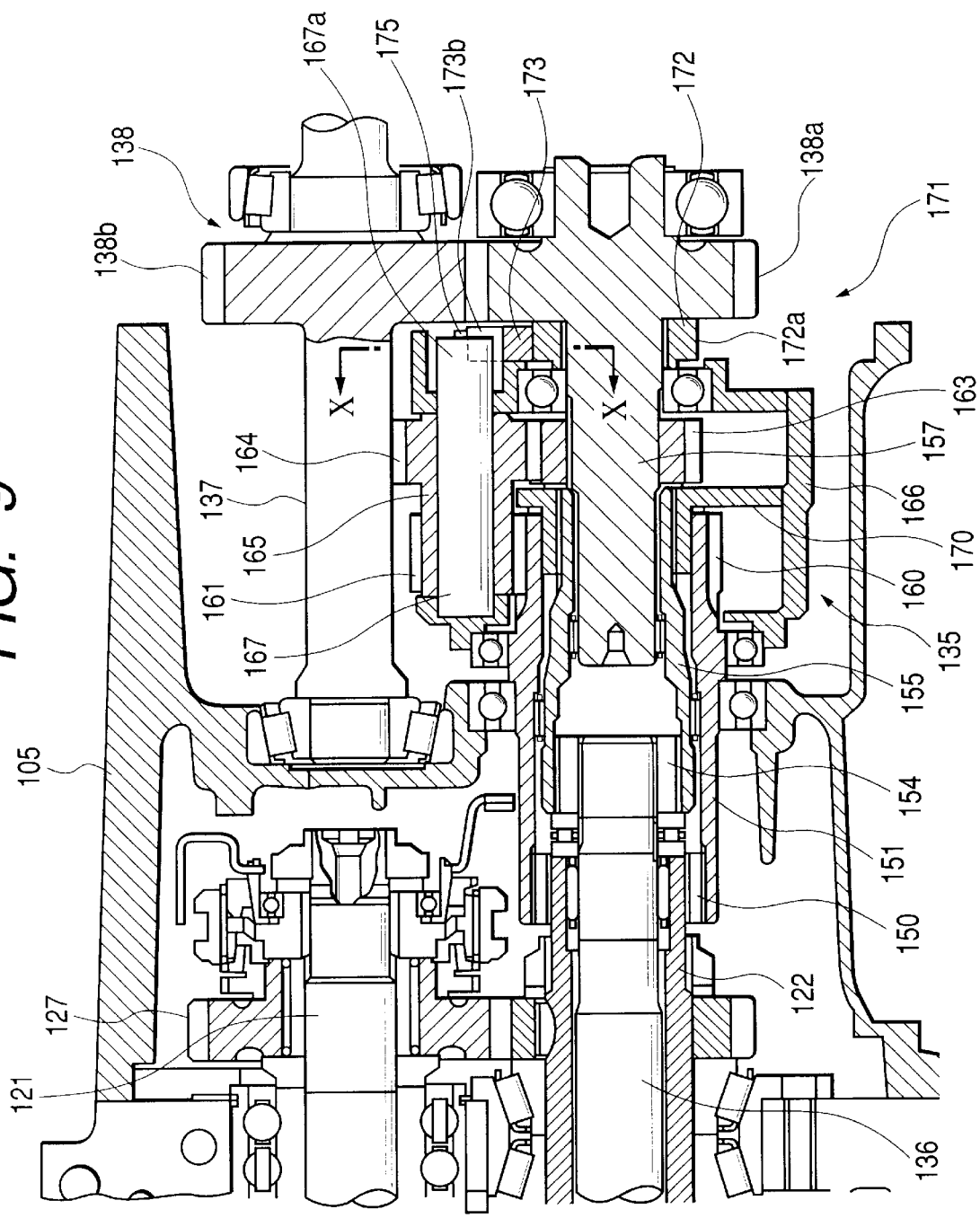
FIGS. 9 and 10 relate to the center differential according to a fourth embodiment according to the present invention.
Figure 10:
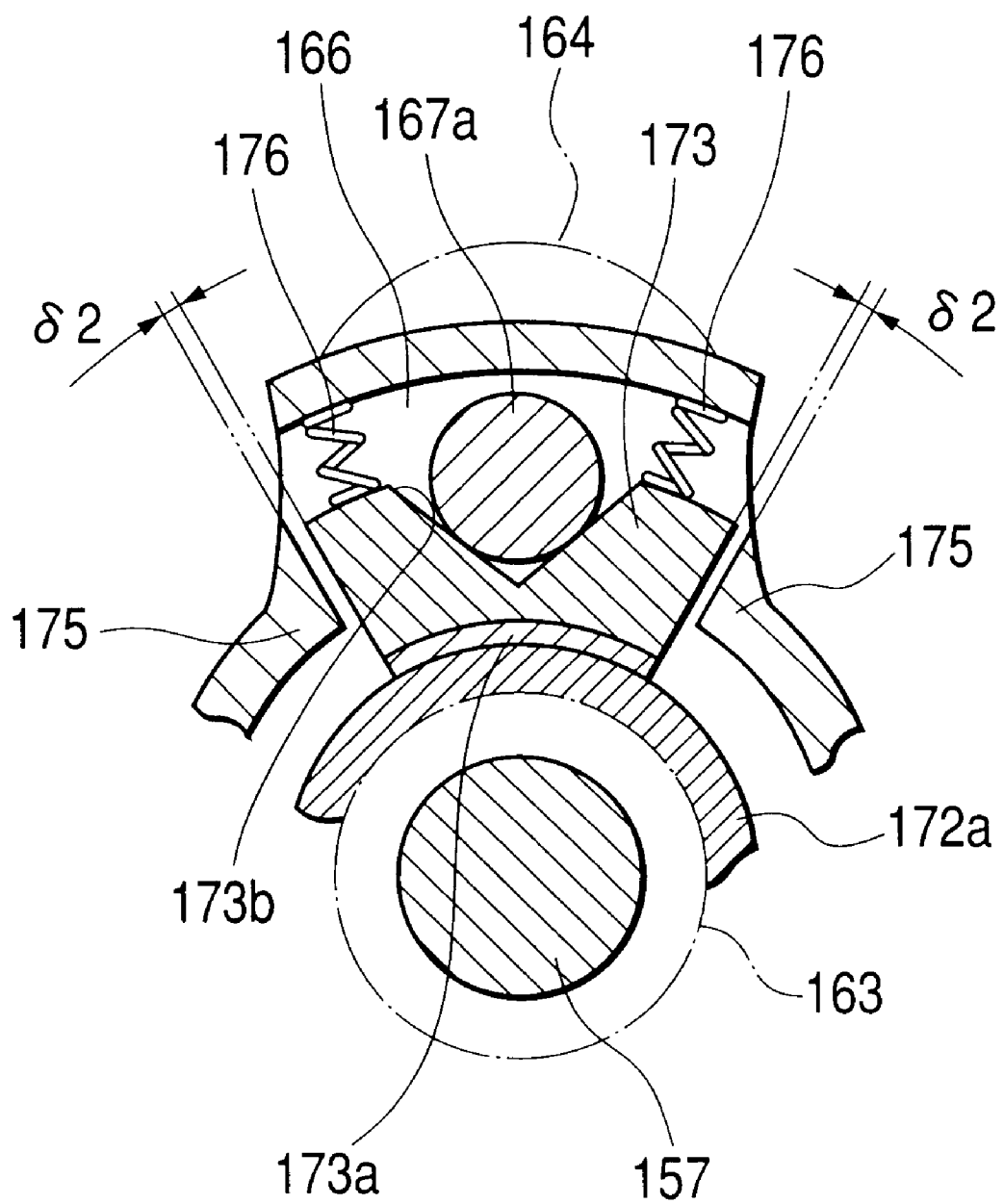

Next, FIGS. 9 and 10 relate to a fourth embodiment according to the present invention, FIG. 9 is a main portion sectional view of a center differential, and FIG. 10 is a X—X sectional view of FIG. 9. Incidentally, in this embodiment, the same structure as the foregoing embodiment is designated by the same symbol, and the description is omitted.

As shown in FIGS. 9 and 10, a differential limiting apparatus 171 is provided with a ring member 172 spline-fitted to a rear output shaft 157 at the rear of a center differential 135, and an annular sliding surface 172a is formed on the outer periphery of the ring member 172. Here, the sliding surface 172a may be directly formed on the rear output shaft 157 without spline-fitting the ring member 172 to the rear output shaft 157.

Besides, an end portion of a pinion shaft 167 is protruded from a rear end surface of a carrier 166 supporting the pinion shaft 167, and a projection 167a of the pinion shaft 167 is made opposite to the sliding surface 172a of the ring member 172.

Besides, a cam member 173 is disposed between the sliding surface 172a and the projection 167a. The cam member 173 is provided with a partially arc-shaped friction surface 173a slidable on the sliding surface 172a, and a V-shaped groove 173b engageable with the projection 167a. The friction surface 173a is brought into contact with the sliding surface 172a, and the V-shaped groove 173b is engaged with the projection 167a, so that the cam member 173 is supported between the sliding surface 172a and the projection 167a. When the cam member 173 is moved relative to the carrier 166 in accordance with the shifting amount of engagement position of the V-shaped groove 173b relative to the projection 167a, a press force in the direction toward the sliding surface 172a is generated in the cam member 173. At this time, the friction resistance of the friction surface 173a with respect to the sliding surface 172a is also increased, so that differential limitation is made between the rear output shaft 157 and the carrier 166. Here, the friction surface 173a is formed on the cam member 173 by coating the friction material/member, or by attaching the friction member, and so on.

Besides, at the rear end surface of the carrier, a pair of restriction sections 175, 175 are protrusively formed at both sides of the cam member 173. The restriction sections 175, 175 regulate the movement of the cam member 173 in both rotation directions of the carrier 166 while a predetermined swing is permitted, and respectively have gaps of $\delta 2$ at both sides of the cam member 173 when the cam member 173 is located at a symmetrical position with respect to the projection 167a. Here, the amount of movement of the cam member 173 with respect to the carrier 166 is regulated by suitably setting the gap $\delta 2$, so that the maximum value of a differential limitation torque by the cam member 173 is set, and a lock by an excessive movement of the cam member 173 is prevented.

Besides, in the carrier 166, springs 176, 176 as a pair of energizing members are provided at both sides of the projection 167a, and the springs 176, 176 energize the cam member 173 in the direction toward the sliding surface 172a. Here, the energizing force by the springs 176, 176 is set to a minimum energizing force necessary for the cam member 143 to generate an initial torque between the front and rear wheels. At the same time, the springs 176, 176 have such a function that when the cam member 173 is moved relatively to the carrier 166, it is energized to restore/return to the original position.

According to the structure described above, substantially the same operation and effect as the foregoing embodiment according to the invention can be obtained. In this case, although a centrifugal force in accordance with the number of the revolutions of the carrier 166 acts on the cam member 173, contrary to the third embodiment, the centrifugal force acts in the direction to cancel the differential limitation torque.

Although the description in the foregoing respective embodiments has been made on the example in which the differential limiting apparatus of the present invention is provided in the center differential, the present invention is not limited to this. The differential limiting apparatus according to the present invention may be applied to, for example, the planetary gear type differential in which the torque distribution between right and left wheels is made.

Besides, the structure of the planetary gear type differential is not limited to one having the pair of sun gears and the pair of pinions.

Besides, in the foregoing embodiments, although the description has been made on the differential in which both the carrier and the second sun gear are set as output components, the present invention is not limited to this, but for example, the carrier or the second sun gear may be setted as an input component.

Note that although the above-mentioned embodiments according to the present invention are separately explained, it is possible for a person skill in the art to combine or utilize a main portion of one of embodiments to the other.

While there has been described in connection with the preferred embodiments of the invention, it will be understood to those skilled in the art that various changes and modifications may be made therein without departing from the invention, and it is aimed, therefore, to cover in the appended claims all such changes and modifications as fall within the true spirit and scope of the invention.

As described above, according to the third aspect of the present invention, the differential locking or limiting apparatus of the planetary gear type differential can be constructed to be simple and small-sized.

What is claimed is:

1. A planetary gear type differential apparatus provided on a shaft member and having a carrier rotatably mounted on said shaft member, a sun gear secured on said shaft member, a pinion meshing with said sun gear, and a pinion shaft secured to said carrier for rotatably supporting said pinion, comprising:

a sliding surface provided on said shaft member;

a projection formed at an end portion of said pinion shaft and projected from an end surface of said carrier; and a cam member provided between said sliding surface and said projection, said cam member including a friction surface slidable on said sliding surface and a V-shaped groove engageable with said projection.

2. The differential apparatus according to claim 1, wherein said shaft member comprises:

a shaft rotatably fitted to the center of said carrier; and a drum member rigidly connected with said shaft, said sliding surface being formed on an inner periphery of said drum member.

3. The differential apparatus according to claim 2, further comprising:

a pair of restriction sections for restricting a sliding range of said cam member on said sliding surface, said sliding surface being interposed between said restriction sections in a circumferential direction of said shaft member, wherein said restriction sections are formed on said drum member.

4. The differential apparatus according to claim 1, wherein said shaft member comprises:

a shaft rotatably fitted to the center of said carrier; and a ring member coupled with said shaft, said sliding surface being formed on an outer periphery of a ring member secured to said shaft.

5. The differential apparatus according to claim 4, further comprising:

a pair of restriction sections for restricting a sliding range of said cam member on said sliding surface, said sliding surface being interposed between said restriction sections in a circumferential direction of said shaft member, wherein said restriction sections are formed on said ring member.

6. The differential apparatus according to claim 1, further comprising:

a pair of restriction sections for restricting a sliding range of said cam member on said sliding surface, said sliding surface being interposed between said restriction sections in a circumferential direction of said shaft member.

7. The differential apparatus according to claim 1, further comprising:

a pair of restriction sections formed at an end surface of said carrier and disposed at both sides of the cam member, each of said restriction sections regulating the movement of said cam member in a rotational direction of the carrier while a predetermined swing motion is permitted.

8. The differential apparatus according to claim 7, wherein said shaft member comprises:

a shaft having an outer periphery on which said sliding surface is formed.

9. The differential apparatus according to claim 7, wherein said shaft member comprises:

a shaft; and a drum member fixed to said shaft and having an inner periphery on which said sliding surface is formed.

10. The differential apparatus according to claim 7, wherein said shaft member comprises:

a shaft; and a ring member coupled with said shaft and having an outer periphery on which said sliding surface is formed.

11. The differential apparatus according to claim 1 further comprising:

an energizing member urging said cam member towards said sliding surface.

12. A planetary gear type differential apparatus provided on a shaft member, said planetary gear type differential apparatus having a carrier mounted on said shaft member, a sun gear provided at said shaft member, a pinion engaged with the sun gear, and a pinion shaft for rotatably supporting the pinion to said carrier, comprising:

a sliding portion provided on the shaft member;

a projection formed by protruding an end portion of said pinion shaft from an end surface of the carrier;

a cam member disposed between said sliding portion and said projection, said cam member including a friction surface that is slidably engaged with the sliding portion and a V-shaped groove that is engageable with said projection; and a pair of restriction sections formed at an end surface of the carrier and disposed at both sides of the cam member, each of said restriction sections regulating the movement of said cam member in a rotational direction of the carrier while a predetermined swing motion is permitted.

13. The differential apparatus according to claim 12, wherein said shaft member comprises:

a shaft having an outer periphery on which said sliding portion is formed.

14. The differential apparatus according to claim 12, wherein said shaft member comprises:

a shaft; and a drum member fixed to the shaft portion and having an inner periphery on which said sliding portion is formed.

15. The differential apparatus according to claim 12, wherein said shaft member comprises:

a shaft; and a ring member coupled with said shaft and having an outer periphery on which said sliding portion is formed.

16. The differential apparatus according to claim 12, further comprising:

an energizing member urging said cam member towards said sliding portion.

* * * * *